June 10, 1930.  L. A. GEBHARD  1,762,859
TUBE TEMPERATURE AND LOSS INDICATING DEVICE
Filed Nov. 24, 1928
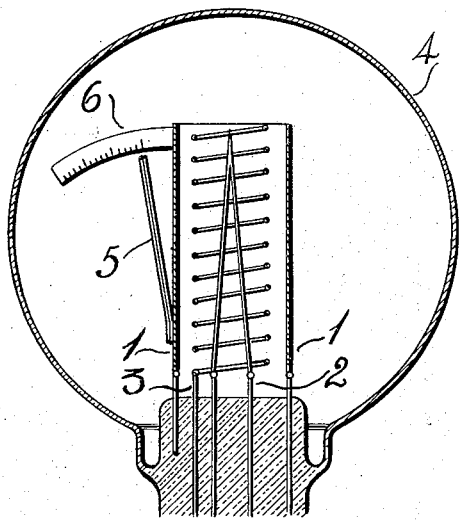
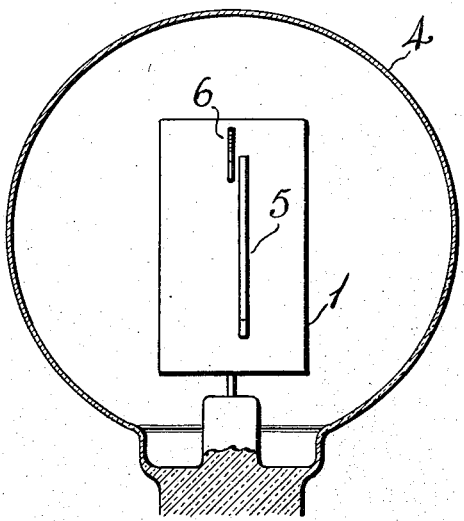
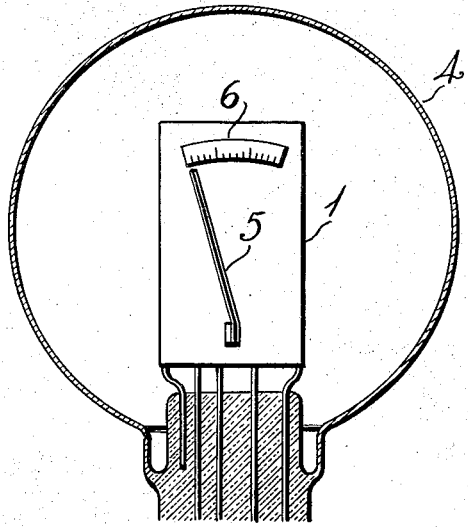
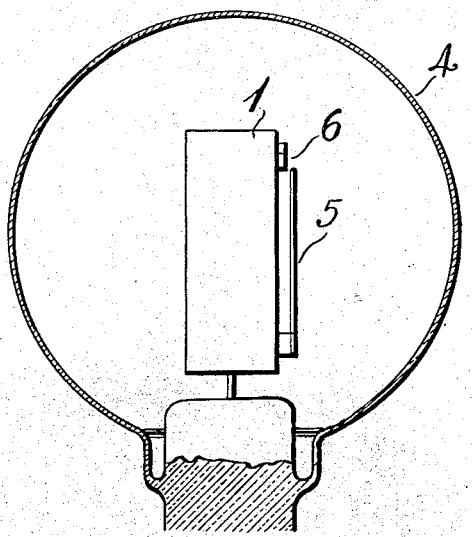
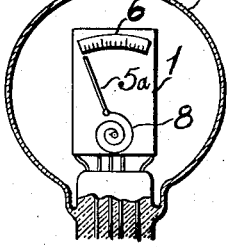
INVENTOR.
Louis A. Gebhard,
BY Harold Dodd
ATTORNEY Patented June 10, 1930

1,762,859

UNITED STATES PATENT OFFICE

LOUIS A. GEBHARD, OF WASHINGTON, DISTRICT OF COLUMBIA, ASSIGNOR, BY MESNE ASSIGNMENTS, TO FEDERAL TELEGRAPH COMPANY, A CORPORATION OF CALIFORNIA

TUBE-TEMPERATURE AND LOSS-INDICATING DEVICE

Application filed November 24, 1928. Serial No. 321,718.

My invention relates to thermionic tubes in general and more specifically to means for improving the efficiency of thermionic tubes.

An object of my invention is to provide an indicating device whereby the efficiency of systems employing thermionic tubes may be increased.

Another object of my invention is to provide an indicating device whereby the temperature of electrodes enclosed in an evacuated vessel may be determined.

Other and further objects of my invention reside in the specification following and in the accompanying drawings wherein:

Figures 1 and 2 illustrate one embodiment of my invention and Figs. 3, 4 and 5 are illustrations showing other embodiments of the thermionic tube of my invention.

In thermionic tubes, wherein electrodes are enclosed in an evacuated container, it is desirable to determine the temperature at which the electrodes are operating. The efficiency of many thermionic tubes is proportional to the temperature. The temperature of the electrodes is difficult to determine because of the vessel in which they are contained and the temperature distribution properties of the evacuated space which surrounds them. A better understanding of my invention can be had by referring to the accompanying drawings and to the specification following.

Fig. 1 is an illustration showing a cross-section of the thermionic tube of my invention. An evacuated container 4 may be of any suitable silicate composition. Electrodes 1, 2 and 3 correspond to the anode, cathode and control electrodes respectively. A bi-metallic member 5 is positioned at one end to the anode 1. A scale 6 is also positioned to anode 1 by means of which indications of temperature may be observed. Fig. 2 of the accompanying drawings shows another view of the anode 1 contained in an evacuated vessel 4. Indicator 5 of bi-metallic composition is shown in combination with scale 6. Fig. 1 of the accompanying drawings shows a thermionic tube similar to the type employed in signaling systems. When such thermionic tubes are employed it is the usual practice to supply a relatively high potential to the anode 1 in respect to the cathode 2. Because of the electron stream from the heated cathode 2 and the potential supplied anode 1, the temperature of the anode 1 many times becomes excessive. The loss of efficiency caused thereby is proportional to the temperature of the anode 1. An indicator or pointer 5, one end of which is positioned to anode 1 is a strip of bi-metallic material. The two metals comprising the composition of indicator 5, having different coefficients of expansion, cause the end not positioned to the anode 1 to swerve away from the plane of the anode, the angle depending on the degree of temperature. Since the angle is a function of the temperature and increases therewith, it is obvious that the scale 6 may be accurately calibrated to indicate the temperature of the anode 1. Of the two dissimilar metals comprising the indicator 5, the metal having the greater expansion per degree of temperature increase is placed nearest the anode 1. The two metals may be any such metals as brass and iron. Both indicator 5 and scale 6 may be electrically welded to anode 1. Different metals having different coefficients of expansion may be selected depending upon the power rating of the type of thermionic tube employed.

Another arrangement of the indicating device in the thermionic tube of my invention is shown in Figs. 3 and 4. In this arrangement the envelope 4 encloses the electrode 1. Scale 6 is positioned to electrode 1 as is also one end of bi-metallic indicator 5. Two dissimilar metals are employed constituting indicator 5, each having coefficients of expansion differing from the other. In this arrangement the two dissimilar metals are so positioned in respect to anode 1 that the difference in the expansion of the metals will cause the indicator 5 to move in a plane parallel to the plane of the anode 1 rather than perpendicular as illustrated in Figs. 1 and 2. The two dissimilar metals are positioned in respect to the plane of the anode 1 in such a manner that the direction in which the free end of indicator 5 moves, due to the difference in the coefficient of expansion of the two metals, is parallel to the plane of the anode 1. The direction of movement of indicator 5 in the arrangement shown in Figs. 1 and 2 is perpendicular to the plane of anode 1. The latter arrangement wherein indicator 5 moves in a direction parallel to the plane of anode 1 provides an equal scale division and means for more accurately determining the temperature. In the first mentioned arrangement, the temperature transmitted to indicator 5 by radiation from anode 1, is proportionally less as the angle between indicator 5 and the plane of anode 1 increases. This would cause the divisions on scale 1 to be of unequal value.

When the amount of movement in the arrangements illustrated in Figs. 1 and 2 or 3 and 4 is insufficient, an arrangement similar to the arrangement shown in Fig. 5 may be employed. The latter arrangement may be caused to be more sensitive to differences in temperature than the two former arrangements illustrated in Figs. 1 and 2, and 3 and 4. In Fig. 5 an envelope 4 encloses the anode 1. A scale 6 is positioned on anode 1. A bi-metallic strip 8 is formed in a spiral, the inner end of which is positioned to anode 1. To the outer end of bi-metallic strip 8 may be fastened an indicator 5ª. Indicator 5ª may be of any material having a small expansion per degree increase in temperature. This arrangement may be caused to be very sensitive to small variations of temperature and therefore provides means for discriminating between normal and abnormal operation of the tube. The latter arrangement may be successfully employed with tubes having a low power rating and where the safe operational temperature is of a low value. While the accompanying drawings illustrate the triode it is obvious that the temperature indicator may be employed with any type of thermionic tube. It is possible to measure the useful output energy of a thermionic tube by subtracting the losses from the total input energy. One of the greatest losses is the loss of energy giving rise to the heating of the anode and adding nothing to the efficiency of the thermionic tube. The losses due to resistance may be determined with great accuracy as may also the losses caused by neutralization of stray fields, coupling systems and the like. In high frequency signaling systems or low frequency amplifying systems, the losses may be determined with accuracy and added to the loss caused by heating of the anode, thereby determining the losses in the systems. Substracting the sum losses from the total input gives the efficiency of the system which may be expressed in percentage efficiency or useful output energy.

I realize that many modifications of the thermionic tube of my invention are possible. For instance, the scale 6 may be etched on the glass or silicate composition envelope 4. It is to be understood that my invention shall not be limited to the accompanying drawings or to the foregoing specification but only as defined in the appended claim.

What I claim as new and desire to secure by Letters Patent of the United States is as follows:

A thermionic tube comprising in combination electrodes enclosed by a transparent envelope, a thermo-expansive member contained within said envelope and thermally connected with one of said electrodes, said member comprising a plurality of dissimilar metals thermally responsive to the temperature of said electrode and a graduated member adjacent said thermo-expansive member whereby the temperature of said electrode may be determined.

LOUIS A. GEBHARD.